United States Patent
Scott et al.

(10) Patent No.: US 6,554,301 B2
(45) Date of Patent: Apr. 29, 2003

(54) ROLLBAR SUPPORT UNIT

(75) Inventors: James Scott, Fox Point, WI (US);
Marilyn Scott, Fox Point, WI (US);
Kenneth Maio, West Allis, WI (US);
Mark Sturm, Greenfield, WI (US)

(73) Assignee: Sterling Handling Equipment, Inc., Milwaukee, WI (US)

( * ) Notice: Subject to any disclaimer, the term of this patent is extended or adjusted under 35 U.S.C. 154(b) by 0 days.

(21) Appl. No.: 09/904,211

(22) Filed: Jul. 12, 2001

(65) Prior Publication Data

US 2003/0011154 A1 Jan. 16, 2003

(51) Int. Cl.⁷ ............................................... B62B 1/00
(52) U.S. Cl. ........................ 280/47.31; 280/47.12; 298/3
(58) Field of Search .................... 280/47.131, 47.17, 280/47.24, 47.26, 47.31, 47.33, 47.3, 652, 653, 654, 47.12, 659; 180/19.1, 19.2, 19.3; 298/2, 3, 5, 175 A; D34/16

(56) References Cited

U.S. PATENT DOCUMENTS

| | | | | | |
|---|---|---|---|---|---|
| 355,245 | A | * | 12/1886 | Annin | 280/47.31 |
| 938,917 | A | * | 11/1909 | Truxler | 280/47.18 |
| 1,340,898 | A | * | 5/1920 | Keminskis | 280/47.34 |
| 2,102,684 | A | * | 12/1937 | Dorward | 280/47.12 |
| 2,124,956 | A | * | 7/1938 | Roemer | 280/47.12 |
| D116,868 | S | * | 9/1939 | Staub | D34/16 |
| 2,189,079 | A | * | 2/1940 | Mueller et al. | 298/2 |
| 2,247,083 | A | * | 6/1941 | Garlinghouse | 280/47.12 |
| 2,422,331 | A | | 6/1947 | Bates | |
| 2,533,549 | A | * | 12/1950 | Bell | 298/2 |
| 2,591,857 | A | * | 4/1952 | O'Shea | 280/47.31 |
| 3,282,600 | A | * | 11/1966 | Tonelli | 280/47.31 |
| 4,070,060 | A | * | 1/1978 | Howard | 298/2 |
| 4,270,786 | A | * | 6/1981 | Mattox | 298/3 |
| 4,457,546 | A | * | 7/1984 | Wiant et al. | 293/102 |
| 5,026,079 | A | | 6/1991 | Donze et al. | |
| 5,087,061 | A | | 2/1992 | Wallace | |
| 5,106,113 | A | | 4/1992 | Piacentini | |
| D329,726 | S | * | 9/1992 | Travis | D34/16 X |
| D349,797 | S | * | 8/1994 | Daugherty | D34/16 |
| 5,415,421 | A | * | 5/1995 | Godwin | 280/47.31 |
| 5,601,298 | A | | 2/1997 | Watanabe | |
| 5,884,924 | A | | 3/1999 | Fairchild et al. | |
| 6,488,130 | B1 | * | 12/2002 | Bermel | 280/47.31 X |

FOREIGN PATENT DOCUMENTS

| | | | |
|---|---|---|---|
| GB | 711297 | * | 6/1954 |
| GB | 773981 | * | 5/1957 |
| GB | 2046674 | * | 11/1980 |
| NO | 54596 | * | 11/1934 |

* cited by examiner

Primary Examiner—Brian L. Johnson
Assistant Examiner—Bryan Fischmann
(74) Attorney, Agent, or Firm—Sonnenschein Nath & Rosenthal

(57) ABSTRACT

A rollbar support unit device to be assembled to a wheelbarrow. A mount is fastened to a front portion of a tray. A first leg having a first curvilinear portion which is positioned to curve outwardly from the front portion is connected to the mount. A second leg having a second curvilinear portion which is positioned to curve outwardly from the front portion is also connected to the second leg support connected to the first tray and second tray respectively. The rollbar support unit device is configured to pivot the wheelbarrow in a safe and smooth manner.

25 Claims, 3 Drawing Sheets

ROLLBAR SUPPORT UNIT

BACKGROUND OF THE INVENTION

The present invention relates to a device to pivot a material handler. In particular, the invention relates to methods and other accommodations to pivot a wheelbarrow to efficiently support and empty the wheelbarrow.

A wheelbarrow is a device that is used to transport heavy loads by hand. A wheelbarrow consists of a tray mounted on a wheel and two legs with handles that extend to the rear of the tray. A wheelbarrow is moved by lifting its handles to raise the legs off the ground, pivoting and balancing the loaded wheelbarrow on its wheel, and walking the wheelbarrow to the location for the load to be emptied. A wheelbarrow is typically unloaded by emptying the contents wherein the worker lifts the handles to pivot the tray into a vertical position in order for the load to slide or pour out of the forward portion of the tray.

Wheelbarrows are especially useful in moving loads across soft or uneven ground because the single wheel provides high maneuverability and also because the user can easily keep the load balanced by raising or lowering one or both of the handles. Wheelbarrows are also especially useful because of their ability to easily empty the load. However, as the weight of the load increases, it becomes more difficult to balance the wheelbarrow during movement and emptying.

Emptying a heavy load is particularly difficult because the user must change from lifting the handles with an underhanded grip to pushing the handles with an overhanded grip while simultaneously balancing the wheelbarrow on a single wheel as the load rapidly shifts position. Further, to completely empty the load in the tray, the worker is often required to shake and vibrate or rock the wheelbarrow back and forth with the wheelbarrow in the vertical position.

Additionally, during such a forward emptying operation, the wheelbarrow often loses its balance, especially when the load is heavy or the worker is not strong enough or skilled enough. It is not only inefficient but also dangerous if a wheelbarrow accidentally topples with its heavy load in the vertical position.

Thus, efficiently emptying a load is crucial to maintaining an organized and safe work area. As such, pivoting the tray of the wheelbarrow in a tight and smooth manner is extremely important. Typical wheelbarrows, in use, present different mechanisms to pivot and empty the load from the tray. Commonly, the wheelbarrow will utilize a wheel guard or front guard which includes a horizontal bar in front of the wheel. These typical wheelbarrows further use two tray braces connected between the front guard and a support plate which is mounted on the front portion of the wheelbarrow. The worker will pivot the wheelbarrow via the tray braces. Typically, the tray brace comprises a flat piece of steel extending from the tray to the undercarriage of the wheelbarrow. Alternatively, existing wheelbarrows will use one piece tubular members which act as the pivot point in front of the wheel. Further, these one-piece tubular members also act as the handles.

A problem with emptying the load with these mechanisms, however, is being to conveniently and efficiently pivot the tray as the front guards do not provide a smooth pivot motion while the worker is lifting the handles resulting in a difficult and unsafe discharge of the load. Accordingly, the operator often loses control and dumps the load. Additionally, with the front guard, current wheelbarrows must be pivoted almost completely upside down or another worker must clean the wheelbarrow with a hoe or shovel to completely discharge the wheelbarrow. Additionally, the front guard, the two tray braces and the support plate typically used are separate pieces adding to the components which comprise the wheelbarrow assembly. Thus, the added components increase the assembly required to make the wheelbarrow resulting in higher manufacturing costs. Further, the added components increase the chance for the component to fail resulting in costly repairs and lost work time. Further, one-piece tubular members commonly do not provide enough pivot force required by heavier loads resulting in the tubular members becoming bent. As the one-piece tubular members become bent from the load, the worker is required to remove and replace the entire tubular member resulting in work downtime and costly repairs.

A need, therefore, exists to safely and efficiently support the wheelbarrow and transport the wheelbarrow. A need also exists to efficiently and conveniently discharge a load from the tray. The solution, however, must be capable of pivoting the tray holding a heavy load without failing. Additionally, the solution must not add extra elements to the wheelbarrow assembly to limit assembly and repair costs.

Because of the difficulty in balancing a conventional wheelbarrow while emptying the load, many different modifications have been suggested which fail to meet the current need. U.S. Pat. No. 5,601,298 issued to Watanabe discloses a wheelbarrow having a front guard positioned in front of the wheel. The front guard comprises a bar portion or a curved plate which acts as the pivot point while the wheelbarrow is in the vertical position. This front guard does not solve the current need, though, as the front guard does not provide enough of a pivot point. Because the front guard is a bar portion or small curved plate, the front guard does not provide a larger curvature required for a pivot in a smooth manner. Accordingly, tipping the wheelbarrow in the vertical position will result in an abrupt stop by the front guard leading to an unbalanced and unsafe condition. Further, the wheelbarrow requires two tray braces in addition to the separate front guard. Thus, the front guard is an extra element which requires increased assembly time of the wheelbarrow.

Another device, U.S. Pat. No. 5,884,924 issued to Fairchild et al. discloses another wheelbarrow having two spaced apart roll bars which are one piece tubular members which extend from the bottom of the tray to a point in front of the wheel. The roll bars then extend up vertically for at least six inches to connect to the top of the tray. This wheelbarrow does not solve the current need either, as the roll bars are tubular members which cannot support heavier loads resulting in the tubular members becoming bent. Further, the roll bars are continuations of the handles so that when the roll bar becomes bent, the entire assembly needs to be replaced resulting in a longer downtime for repairs. Additionally, the upward curve of the roll bar is located below the wheel axle resulting in a sharp curve which prevents any pivoting movement of the wheelbarrow in a smooth manner.

SUMMARY OF THE INVENTION

The present invention relates to a brace for a material handler, in particular, a rollbar support unit that supports and pivots a wheelbarrow in a safe and smooth manner.

In an embodiment, the rollbar support unit connects to a tray of a wheelbarrow wherein the rollbar support unit comprises a mount removably fastened to a front portion of the tray. The rollbar support unit further comprises a first leg connected to the mount wherein the first leg extends down from the front portion. Additionally, the first leg has a first curvilinear portion positioned to curve outwardly from the front portion.

The rollbar support unit further comprises a second leg connected to the mount wherein the second leg also extends down from the front portion. The second leg also has a second curvilinear portion positioned to curve outwardly from the front portion. Both the first curvilinear portion and the second curvilinear portion are positioned above a wheel axle at the wheelbarrow.

A first leg support connects to the first leg opposite the mount while a second leg support connects to the second leg opposite the mount wherein the first leg support and the second leg support connect to the first leg and the second leg at an angle greater than ninety degrees.

In an embodiment, the first leg support further connects at the bottom of a first handle end of the wheelbarrow while the second leg support connects at the bottom of a second handle end of the wheelbarrow.

In an embodiment of the present invention, a wheelbarrow comprises a tray having an open upper portion, a front portion, and a bottom portion. The wheelbarrow further comprises a first handle end and a second handle end positioned below the bottom portion.

Additionally, a wheel is mounted between the first handle end and the second handle end at a position in front of the forward portion wherein the wheel has a wheel axle transmitted therethrough in order to transport the wheelbarrow.

The embodiment further comprises a mount removably fastened to the front portion of the tray. Further, a first leg is connected to the mount wherein the first leg extends down from the front portion. The first leg additionally has a first curvilinear portion positioned to curve outwardly from the front portion.

A second leg is connected to the mount wherein the second leg also extends down from the front portion. The second leg further has a second curvilinear portion positioned to curve outwardly from the front portion.

Additionally a first leg support connects to the first leg opposite the mount and a second base support connects to the second leg opposite the mount in order to connect the first leg and the second leg to the wheelbarrow.

An advantage of the present invention is to provide a rollbar support unit that efficiently and conveniently pivots the tray in a smooth manner.

Another advantage of the present invention is to provide a rollbar support unit that can adequately support a heavy load.

Another advantage of the present invention is to provide a rollbar support unit that eliminates multiple assembly elements.

Another advantage of the present invention is to provide a rollbar support unit that can be conveniently and efficiently be connected to the wheelbarrow.

Still further advantages will become apparent from a consideration of the following descriptions and drawings.

DETAILED DESCRIPTION OF THE PREFERRED EMBODIMENTS

As discussed above, the present invention provides structures and other accommodations to pivot a wheelbarrow in order to efficiently and safely support and empty a load from the wheelbarrow.

Figure 1:
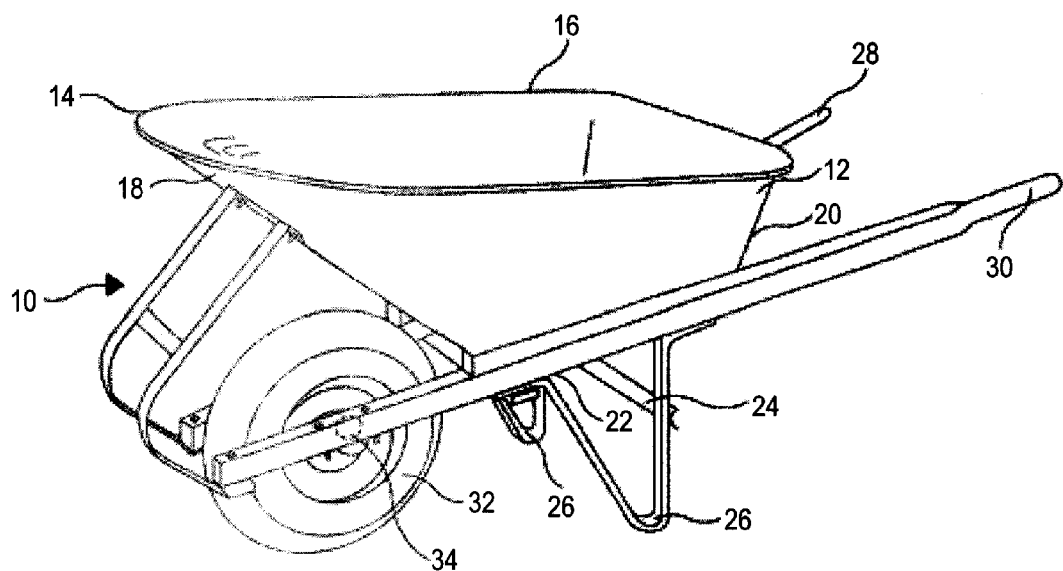
FIG. 1 is a perspective view of a rollbar support unit attached to a wheelbarrow embodying principles of the present invention.

FIG. 1 illustrates a perspective view of an exemplary rollbar support unit 10 to pivot a wheelbarrow 12 in a smooth manner with general principles of the invention. As shown in FIG. 1, the wheelbarrow 12 includes a tray 14 that has an upper portion 16 to carry the load. The upper portion 16 is a concave open space configured to hold the load such as soil, cement, debris and the like. The tray 14 further includes a front portion 18, a rear portion 20 and a lower portion 22. A frame 24 which has legs 26 extending out from the frame connects to the lower portion 22 to keep the wheelbarrow 12 balanced in the horizontal position. A first handle 28 and a second handle 30 also connect to the frame 24 to provide the worker handles to lift and move the wheelbarrow 12. Typically, the first handle 28 and the second handle 30 are made of wood.

The first handle 28 and the second handle 30 typically extend rearwardly past the rear portion 20 and extend forwardly past the front portion 18 as shown in FIG. 1. Connected between the first handle 28 and the second handle 30 is a wheel 32, which provides the mobility of the wheelbarrow 12. A wheel axle 34 extends through the wheel 32 to connect to the first handle 28 and the second handle 30.

Figure 2:
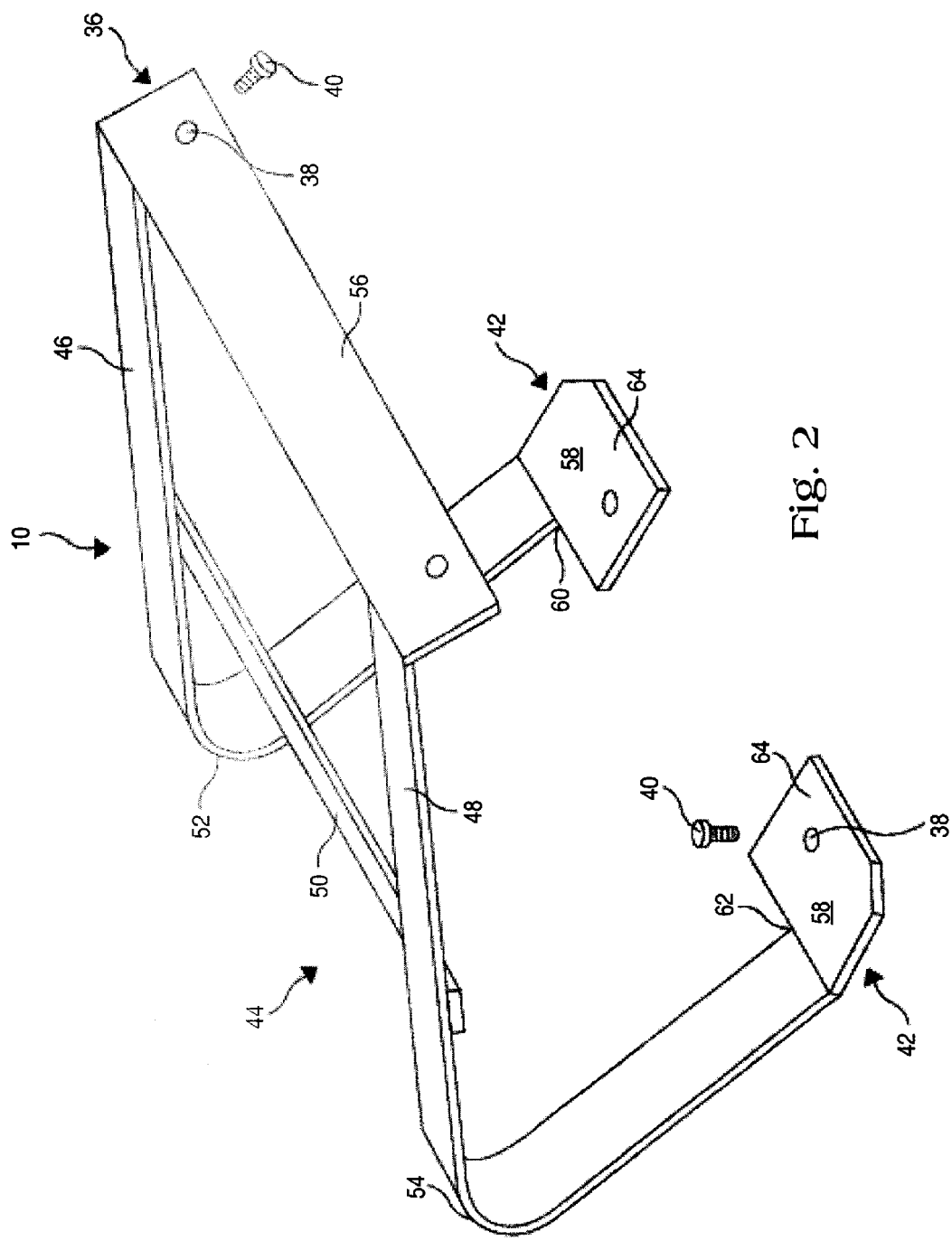
FIG. 2 is a perspective view of the rollbar support unit of FIG. 1.

Turning to FIG. 2, the rollbar support unit 10 comprises a first mounting end, generally shown as 36, which has at least one mounting location 38 for receiving removable fasteners 40 such as nuts and bolts. In the preferred embodiment, the first mounting end 36 has two mounting locations 38 spaced apart from each other. The rollbar support unit 10 also comprises a second mounting end, generally shown as 42, which also has at least one mounting location 38 for receiving removable fasteners 40. A curved portion, generally shown as 44, extends between the first mounting end 36 and the second mounting end 42. The curved portion 44 comprises a first leg 46 and a second leg 48 in which the first leg 46 and the second leg 48 are positioned preferably next to each other with a space in between. As shown in FIG. 2, the first leg 46 and the second leg 48 extend between the first mounting end 36 and the second mounting end 42. A support 50 may be positioned to connect the first leg 46 to the second leg 48 in order to strengthen the rollbar support unit 10. Preferably, the support 50 may be welded between the first leg 46 and the second leg 48. It should be known to those in the art that more than one support 50 may be positioned between the first leg 46 and the second leg 48.

As shown in FIG. 2, the first leg 46 further has a first curvilinear portion 52 which provides a pivot point in which to pivot the wheelbarrow 12 toward the vertical direction. Accordingly, the second leg 48 has a second curvilinear portion 54 which also provides a pivot point to pivot the wheelbarrow toward the vertical direction. As shown in FIG. 2, the support 50 is positioned above the first curvilinear portion 52 and the second curvilinear portion 54. The support 50, however, may also be positioned below the first curvilinear portion 52 and the second curvilinear portion 54. Further, the support 50 may be positioned at the first curvilinear portion 52 and the second curvilinear portion 54 wherein the support 50 in this configuration is capable of being curved shaped to facilitate the pivot motion of the wheelbarrow.

Figure 3:
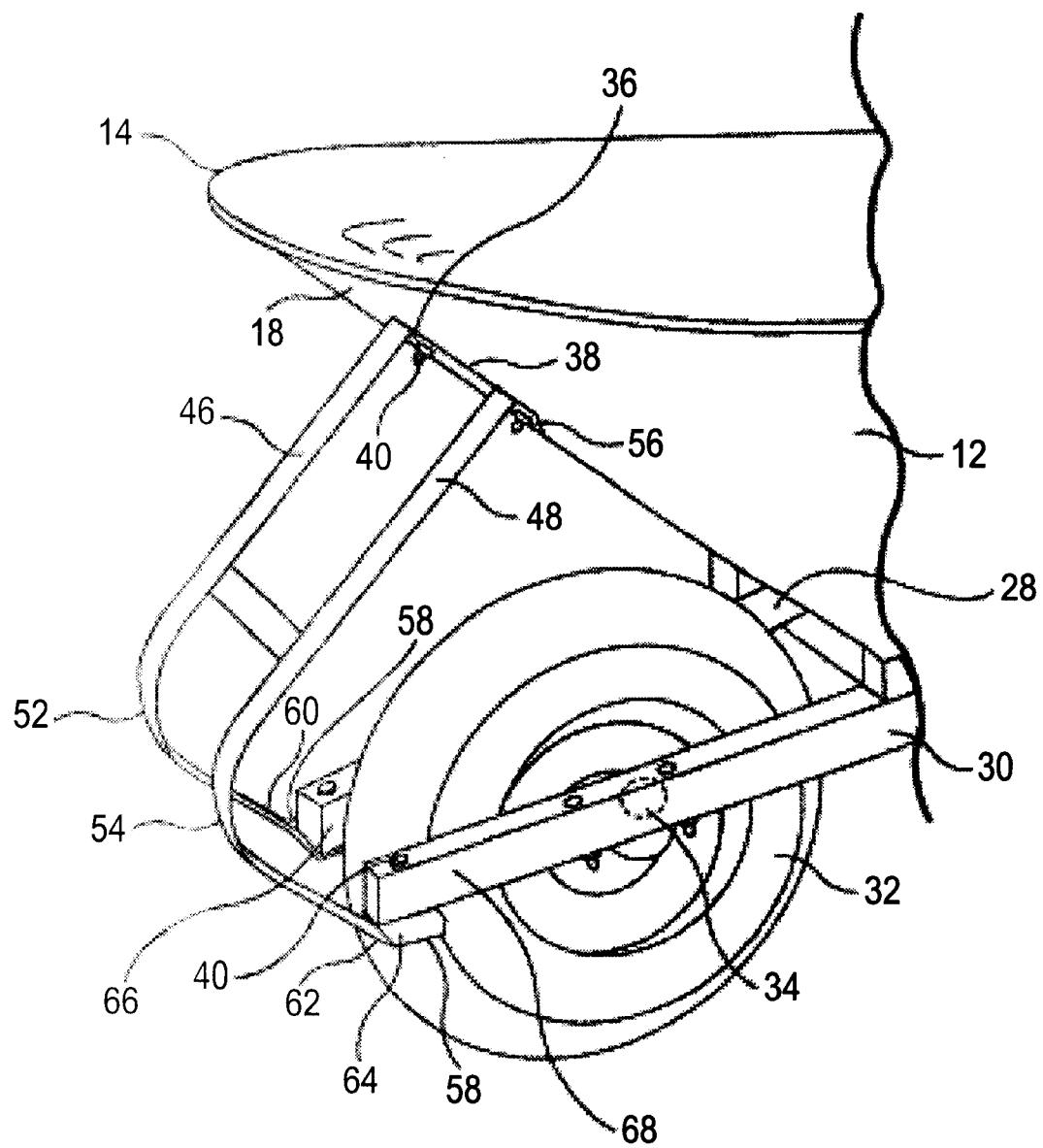
FIG. 3 is a detail perspective partial view of the rollbar support unit of FIG. 1 attached to the wheelbarrow.

Referring to FIG. 3, both the first curvilinear portion 52 and the second curvilinear portion 54 outwardly curve from the front portion 18 of the tray 14. Accordingly, the first curvilinear portion 52 and the second curvilinear portion 54 present a surface which curves in a convex manner with respect to the front portion 18. In order to present any pivoting movement of the wheelbarrow 12 in a smooth manner, the first curvilinear portion 52 and the second curvilinear portion 54 may be positioned above the wheel axle 34. By positioning the first curvilinear portion 52 and the second curvilinear portion 54 above the wheel axle 34, the first curvilinear portion 52 and the second curvilinear portion 54 are sized and shaped to provide a more rounded surface resulting in a more smooth pivot of the wheelbarrow 12. This positioning above the wheel axle 34 eliminates the first curvilinear portion 52 and the second curvilinear portion 54 from having to dip below the wheel axle 34 and then back up toward the wheel axle 34. Accordingly, this positioning above the wheel axle 34 eliminates any sharp curvature of the first curvilinear portion 52 and the second curvilinear portion 54. It should be known, however, that the first curvilinear portion 52 and the second curvilinear portion 54 may be positioned below the wheel axle 34 and may also be positioned substantially near the same height as the wheel axle 34.

As shown in FIG. 3, the first leg 46 and the second leg 48 attach to the first mounting end 36. In the preferred embodiment, the first mounting end 36 comprises a mount 56, such as flat bar stock. In order to attach to the mount 56, the first leg 46 and the second leg 48 may be welded to the mount 56. The mount 56, in turn, is preferably connected to the front portion 18 of the tray 14 by removable fasteners 40 such as but not limited to nuts and bolts. The mount 56 is also capable of connecting to the front portion 18 by a weld. Accordingly, the mount 56 may be slightly curved shaped in order to properly align with the shape of the front portion 18 of the wheelbarrow 12.

Turning to FIG. 2, the second mounting end 42 comprises a planar surface, generally shown as 58. The planar surface 58 has at least one mounting location 38 also. As shown in FIG. 2, the planar surface 58 has a first leg support 60 and a second leg support 62 in which the first leg support 60 and the second leg support 62 connect to the first leg 46 and the second leg 48 respectively. As shown in FIG. 2, the first leg support 60 and the second leg support 62 connect to the first leg 46 and the second leg 48 respectively at an angle greater than ninety degrees. Each of the first leg support 60 and the second leg support 62 comprise planar portions 64 which inwardly face each other.

Returning to FIG. 3, the first leg support 60 preferably connects at the bottom of a first handle end 66 of the first handle 28. Accordingly, the second leg support 62 preferably connects at the bottom of a second handle end 68 of the second handle 30. In other embodiments, however, the first leg support 60 and the second leg support 62 may connect to the top of the first handle end 66 and the second handle end 68. The angle between the first leg support 60 and the first leg 46 and the second leg support 62 and the second leg 48 allows the proper clearance of the first leg 46 and the second leg 48 from the first handle end 66 and the second handle end 68. As shown in FIG. 3, the first handle end 66 and the second handle end 68 sit on the planar portions 64 of the first leg support 60 and the second leg support 62. Accordingly, the planar portions 64 are configured to uniformly support the first handle end 66 and the second handle end 68. Preferably, the planar portions 64 may be connected to the first handle end 66 and the second handle end 68 by removable fasteners 40 such as nuts and bolts.

As shown in FIG. 3, the first leg support 60 and the second leg support 62 may connect to the first handle 28 and the second handle 30 at a height substantially the same height as the wheel axle 34. At this height, the first leg support 60 and the second leg support 62 position the first curvilinear portion 52 and the second curvilinear portion 54 to provide a larger curvature resulting in the wheelbarrow 12 pivoting in a smooth manner when positioned in the vertical position.

In the present invention, the first mounting end 36, the second mounting end 42, the first leg 46, the second leg 48, the first leg support 60, the second leg support 62 and support 50 comprise a metal. Preferably, the metal comprises quarter inch bar stock. The quarter inch bar stock allows a heavier load to be deposited in the tray 14. Further, as the first leg 46 and the second leg 48 comprise the quarter inch bar stock, the wheelbarrow 12 is allowed to safely pivot and support the heavier load. Additionally, as the first leg 46 and the second leg 48 are not rounded tubular members, the first leg 46 and the second leg 48 will not bend when properly supporting the heavier load in the vertical position due to the flat bar stock.

During assembly, the present invention provides a convenient, efficient and economical manner of connecting the rollbar support unit 10 to the wheelbarrow 12. In the assembly process, the first leg 46 and the second leg 48 are attached to the mount 56. In the preferred embodiment, the first leg 46 and the second leg 48 are welded to the mount 56. The mount 56, in turn, may be fastened to the front portion 18 of the tray 14 by the removable fasteners 40 via the mounting locations 38. The mount 56 may also be welded to the front portion 18.

The first leg support 60 and the second leg support 62 are aligned with the first handle end 66 and the second handle end 68 respectively. The planar portions 64 of the first leg support 60 and the second leg support 62 are positioned on the bottom end of the first handle end 66 and the second handle end 68 wherein the planar portions 64 are fastened at the bottom ends respectively. Preferably, the planar portions 64 are fastened by the removable fasteners 40 via the mounting locations 38 when the first handle end 66 and the second handle end 68 comprise wood. Alternatively, the planar portions 64 may be positioned in the assembly process on top ends of the first handle end 66 and the second handle end 68. Further, the planar portions 64 may be attached by a weld if the first handle end 66 and the second handle end 68 comprise metal.

By attaching the first leg 46 and the second leg 48 to the mount 56 and by attaching the planar portions 64 to the first handle end 66 and the second handle end 68, the first curvilinear portion 52 and the second curvilinear portion 54 are preferably positioned above the wheel axle 34 to provide a more smooth pivot point for the wheelbarrow 12. Accordingly, in the assembly of the present invention, multiple assembly parts are eliminated as the first leg 46 and the second leg 48 provide the support needed to hold the tray 14 in the horizontal position. Further, as the first leg 46 and the second leg 48 comprise the first curvilinear portion 52 and the second curvilinear portion 54, the pivot area is also provided by the first leg 46 and the second leg 48. Thus, a separate pivot element such as a front guard is eliminated resulting in lower assembly costs. Further, combining the support and pivot mechanism results in fewer elements to fail during use. Therefore, the rollbar support unit 10 of the present invention assembled to the wheelbarrow 12 improves the safety and work life of the wheelbarrow 12.

Accordingly, during use, the worker lifts the first handle 28 and the second handle 30 to move the wheelbarrow 12. The first curvilinear portion 52 and the second curvilinear portion 54 pivot the wheelbarrow 12 in a smooth manner to the vertical position. Because the first leg 46 and the second leg 48 comprise flat bar stock, the tray 14 can be properly supported to efficiently empty the heavy load while in the vertical position leading to a more controlled and safe operation of the wheelbarrow 12.

Although the foregoing detailed description of the present invention has been described by reference to various embodiments, and the best mode contemplated for carrying out the prevention invention has been herein shown and described, it will be understood that modifications or variations in the structure and arrangement of these embodiments other than there specifically set forth herein may be achieved by those skilled in the art and that such modifications are to be considered as being within the overall scope of the present invention.

I claim:

1. A wheelbarrow with a removable rollbar support unit, comprising:
   a tray having an open upper portion, a front portion, and a bottom portion;
   a first handle and a second handle secured to said tray;
   a first end of each handle being positioned beneath said tray and a second end of each handle extending rearwardly of said tray;
   a wheel mounted between said first ends of said first and second handles, the wheel having a wheel axle extending therethrough;
   said rollbar support unit comprising
      a one-piece unit having a first leg formed of flat bar stock and a second leg formed of flat bar stock, both legs having a first end and a second end, said legs being interconnected at their first ends by a mount and interconnected between their first and second ends by a support;
      said mount having attachment openings for receiving removable fasteners therethrough for removably attaching said mount to said front portion of said tray;
      said second ends of said legs forming a mounting surface for engaging said first end of each handle;
      said mounting surfaces having attachment openings for receiving removable fasteners therethrough for removably attaching said mounting surfaces to said first ends of said handles;
      said first and second legs each having a curvilinear portion positioned between said mount and said mounting surface.

2. A wheelbarrow according to claim 1, wherein the mount, the first leg, the second leg, and the support comprise ¼ inch bar stock.

3. A wheelbarrow according to claim 1, wherein said first and second legs each have a support at their second end forming said mounting surface, said supports extending laterally inwardly to provide the mounting surface for attaching said legs to said handles, thereby positioning said legs laterally outwardly of said first ends of said handles, and further apart from each other than a distance between said first ends of said handles.

4. A wheelbarrow according to claim 1, wherein said mounting surfaces comprise planar surfaces.

5. A wheelbarrow according to claim 1, wherein said curvilinear portion curves outwardly from said front portion of the tray.

6. A wheelbarrow according to claim 1, wherein said curvilinear portion is positioned above the wheel axle.

7. A wheelbarrow according to claim 1, wherein the first and second legs connect to said first handle ends at a height substantially equal to the wheel axle of the wheelbarrow.

8. A wheelbarrow according to claim 1, wherein said first and second handles are straight between their first ends and their second ends.

9. A wheelbarrow according to claim 1, wherein said first and second handles comprise straight wooden members.

10. A wheelbarrow according to claim 1, further including ground engaging legs extending downwardly from each handle.

11. A wheelbarrow according to claim 1, wherein said support is positioned between said curvilinear portion and said mount.

12. A wheelbarrow with a removable rollbar support unit, comprising:
    a tray having an open upper portion, a front portion, and a bottom portion;
    a first handle and a second handle secured to said tray;
    a first end of each handle being positioned beneath said tray and a second end of each handle extending rearwardly of said tray;
    a wheel mounted between said first ends of said first and second handles, the wheel having a wheel axle extending therethrough;
    said rollbar support unit comprising
       a one-piece unit having a first leg formed of ¼ inch flat bar stock and a second leg formed of ¼ inch flat bar stock, both legs having a first end and a second end, said legs being interconnected at their first ends by a mount and interconnected between their first and second ends by a support;
       said mount having attachment openings for receiving removable fasteners therethrough for removably attaching said mount to said front portion of said tray;
       said second ends of said legs forming a mounting surface for engaging said first end of each handle;
       said first and second legs each having a support at their second end forming said mounting surface, said supports extending laterally inwardly to provide said mounting surface for attaching said legs to said handles, thereby positioning said legs laterally outwardly of said first ends of said handles, and further apart from each other than a distance between said first ends of said handles;
       said mounting surfaces having attachment openings for receiving removable fasteners therethrough for removably attaching said mounting surfaces to said first ends of said handles;
       said first and second legs each having a curvilinear portion positioned between said mount and said mounting surface.

13. A wheelbarrow according to claim 12, wherein said supports each comprise a planar surface.

14. A wheelbarrow according to claim 12, wherein said curvilinear portion curves outwardly from said front portion of the tray.

15. A wheelbarrow according to claim 12, wherein said curvilinear portion is positioned above the wheel axle.

16. A wheelbarrow according to claim 12, wherein the first and second legs connect to said first handle ends at a height substantially equal to the wheel axle of the wheelbarrow.

17. A wheelbarrow according to claim 12, wherein said first and second handles are straight between their first ends and their second ends.

18. A wheelbarrow according to claim 17, wherein said first and second handles comprise straight wooden members.

19. A wheelbarrow according to claim 12, further including ground engaging legs extending downwardly from each handle.

20. A wheelbarrow according to claim 12, wherein said support is positioned between said curvilinear portion and said mount.

21. A wheelbarrow with a removable rollbar support unit, comprising:
- a tray having an open upper portion, a front portion, and a bottom portion;
- a first handle and a second handle secured to said tray, said first and second handles comprising straight wooden members;
- a first end of each handle being positioned beneath said tray and a second end of each handle extending rearwardly of said tray;
- a wheel mounted between said first ends of said first and second handles, the wheel having a wheel axle extending therethrough;
- said rollbar support unit comprising:
  - a one-piece unit having a first leg formed of ¼ inch flat bar stock and a second leg formed of ¼ inch flat bar stock, both legs having a first end and a second end, said legs being interconnected at their first ends by a mount and interconnected between their first and second ends by a support;
  - said mount having attachment openings for receiving removable fasteners therethrough for removably attaching said mount to said front portion of said tray;
  - said second ends of said legs forming a mounting surface for engaging said first end of each handle;
  - said first and second legs each having a support at their second end forming said mounting surface, said supports extending laterally inwardly to provide said mounting surface for attaching said legs to said handles, thereby positioning said legs laterally outwardly of said first ends of said handles, and further apart from each other than a distance between said first ends of said handles, and said supports each comprising a planar surface;
  - said mounting surfaces having attachment openings for receiving removable fasteners therethrough for removably attaching said mounting surfaces to said first ends of said handles;
  - said first and second legs each having a curvilinear portion positioned between said mount and said mounting surface and wherein said support is positioned between said curvilinear portion and said mount.

22. A wheelbarrow according to claim 21, wherein said curvilinear portion curves outwardly from said front portion of the tray.

23. A wheelbarrow according to claim 21, wherein said curvilinear portion is positioned above the wheel axle.

24. A wheelbarrow according to claim 21, wherein the first and second legs connect to said first handle ends at a height substantially equal to the wheel axle of the wheelbarrow.

25. A wheelbarrow according to claim 21, further including ground engaging legs extending downwardly from each handle.

* * * * *